United States Patent
Dubovsky (10) Patent No.: US 8,513,913 B2
(45) Date of Patent: Aug. 20, 2013

(54) PHOTOVOLTAIC SYSTEM CHARGE CONTROLLER HAVING BUCK CONVERTER WITH REVERSED MOSFETS

(75) Inventor: Stephen Dubovsky, Silver Spring, MD (US)

(73) Assignee: Morningstar Corporation, Jessup, MD (US)

( * ) Notice: Subject to any disclaimer, the term of this patent is extended or adjusted under 35 U.S.C. 154(b) by 385 days.

(21) Appl. No.: 12/959,694

(22) Filed: Dec. 3, 2010

(65) Prior Publication Data
US 2012/0139471 A1    Jun. 7, 2012

(51) Int. Cl.
*H02J 7/00*    (2006.01)
(52) U.S. Cl.
USPC ......................................................... 320/101
(58) Field of Classification Search
USPC ......................................................... 320/101
See application file for complete search history.

(56) References Cited

U.S. PATENT DOCUMENTS

| | | | | |
|---|---|---|---|---|
| 6,184,660 | B1 * | 2/2001 | Hatular | 320/141 |
| 6,914,418 | B2 * | 7/2005 | Sung | 320/140 |
| 7,352,087 | B2 * | 4/2008 | Nguyen et al. | 307/150 |
| 7,834,580 | B2 * | 11/2010 | Haines | 320/101 |
| 8,139,382 | B2 * | 3/2012 | Zhang et al. | 363/41 |
| 2010/0126550 | A1 | 5/2010 | Foxx | |
| 2010/0264869 | A1 | 10/2010 | Dubovsky | |
| 2010/0265747 | A1 | 10/2010 | Egiziano et al. | |
| 2011/0006727 | A1 * | 1/2011 | Blau et al. | 320/101 |

* cited by examiner

Primary Examiner — Ramy Ramadan (57) ABSTRACT

A maximum power point tracking charge controller for photovoltaic systems includes a buck converter for receiving the maximum power voltage from a PV array as input and for supplying voltage output to charge a battery bank while converting the voltage input to a voltage output that matches the voltage required by the battery bank for charging. The buck converter includes an inductor, a first switch, and a second switch comprised of a first MOSFET and a second MOSFET connected in series with a parallel diode, wherein the configuration of the second MOSFET is reversed from the configuration of the first MOSFET.

17 Claims, 9 Drawing Sheets

(Prior Art)

FIG. 5

(Prior Art)

PHOTOVOLTAIC SYSTEM CHARGE CONTROLLER HAVING BUCK CONVERTER WITH REVERSED MOSFETS

BACKGROUND OF THE INVENTION

1. Field of the Invention

The present invention pertains generally to photovoltaic system charge controllers, particularly photovoltaic system charge controllers that employ maximum power point tracking, and to power electronics employed in photovoltaic system charge controllers and inverters.

2. Brief Discussion of the Related Art

Photovoltaic (PV) systems that produce electricity from solar energy have established themselves as a successful and reliable option for electrical power generation. Photovoltaic systems have continually been gaining in popularity as the cost of such systems has been reduced, as the cost of utility-supplied power has escalated, and as greater attention has been paid to the need for renewable, alternative energy sources. Basically, a photovoltaic system includes a photovoltaic (PV) array made up of one or more PV panels or modules composed of photovoltaic cells capable of converting solar energy into direct current (DC) electrical energy, a battery bank made up of one or more batteries for storing the electrical energy produced by the photovoltaic array, and a charge controller for controlling the charging of the one or more batteries with the electrical energy produced by the photovoltaic array. The direct current (DC) electrical energy produced by the photovoltaic array and/or stored in the battery bank is available to power a load. In some systems, the load may include an inverter used to convert the direct current (DC) electrical energy into alternating current (AC) electrical energy suitable to power AC loads. Photovoltaic systems are frequently employed to power loads independently of utility power, such as where electrical power from a public utility grid is unavailable or not feasible, and these photovoltaic systems are commonly referred to as "off-grid" and "stand-alone" photovoltaic systems. In other instances, photovoltaic systems known as "on-grid" and "grid-connected" photovoltaic systems are employed to supply electrical power to the public utility grid.

Photovoltaic systems have been designed with traditional charge controllers that do not employ maximum power point tracking (MPPT), and such controllers may be referred to as non-MPPT charge controllers. Non-MPPT charge controllers connect the PV array directly to the battery bank for charging. Usually there is a mismatch between the output voltage of the PV array and the voltage required to charge the battery bank that results in under-utilization of the maximum power output from the PV array. The reason for the mismatch is that most PV modules are rated to produce a nominal 12V under standard test conditions but, because they are designed for worse than standard test conditions, in actual fact they produce significantly more voltage. On the other hand, a nominal 12V battery for example requires close to an actual 12V (14V typically) depending on battery state of charge. When a non-MPPT charge controller is charging the battery bank, the PV module is frequently forced to operate at a battery voltage that is less than the optimal operating voltage at which the PV module is capable of producing its maximum power. Hence, non-MPPT charge controllers artificially limit power production to a sub-optimal level by constraining the PV array from operating at maximum output power.

A maximum power point tracking (MPPT) charge controller addresses the aforesaid disadvantage of non-MPPT charge controllers by managing the voltage mismatch between the PV array and the battery bank through the use of power electronics. The primary functions performed by MPPT charge controllers involve measuring the PV module output to find the maximum power voltage ($V_{mp}$), i.e. the voltage at which the PV module is able to produce maximum power, and operating the PV module at the maximum power voltage to extract or harvest full power (watts) from the PV array, regardless of the present battery voltage ($V_B$).

Photovoltaic modules are made up of photovoltaic (PV) cells that have a single operating point where the values of the current (I) and voltage (V) of the cell result in a maximum power output. The maximum power voltage $V_{mp}$ varies with operating conditions including weather, sunlight intensity, shading, and PV cell temperature. As the maximum power voltage $V_{mp}$ of the PV module varies, the MPPT charge controller "tracks" the $V_{mp}$ and adjusts the ratio between the maximum power voltage and the current delivered to the battery in order to match what the battery requires. The MPPT charge controller utilizes a control circuit or logic to search for the maximum power output operating point and employs power electronics to extract the maximum power available from a PV module.

A MPPT charge controller employs power electronics that have a higher input voltage than output voltage, hence $V_{mp} > V_B$. In inverters the input voltage could be lower than the output voltage. The power electronics are conventionally designed to include a high frequency DC to DC converter that receives the maximum power voltage from the PV array as converter input and converts the maximum power voltage to battery voltage as converter output. An increase in battery charge current is realized by harvesting PV module power that would be left unharvested using a non-MPPT charge controller. As the maximum power voltage varies, the actual charge current increase that is realized will likewise vary. Generally speaking, the greater the mismatch or disparity between the PV array maximum power voltage and the battery voltage, the greater the charge current increase will be. The charge current increase will ordinarily be greater in cooler temperatures because the available power output and the maximum power voltage of the PV module increase as the photovoltaic cell temperature decreases. In addition, lower battery voltage, as in the case of a highly discharged battery, will result in a greater charge current increase.

Most MPPT charge controllers utilize power electronics designed to include a "buck" converter having topology to "buck" a higher input voltage to a lower output voltage. Buck converters, also known as "step-down" converters, are familiar in the field of power electronics and essentially include an inductor and two complementary switches to achieve unidirectional or bidirectional power flow from input to output. A first of the switches is ordinarily a controlled switch such as a MOSFET or transistor, and the second of the switches is ordinarily an uncontrolled switch such as a diode. The buck converter alternates between connecting the inductor to the input voltage ($V_A$) from the PV array to store energy in the inductor and discharging the inductor into the battery bank. When the first switch is turned "on" for a time duration, the second switch becomes reverse biased and the inductor is connected to the input voltage $V_A$. There is a positive voltage ($V_L$) across the inductor equal to the input voltage $V_A$ minus the output voltage ($V_B$), hence $V_L = V_A - V_B$ and there is an increase in the inductor current ($I_L$). In this "on" state, energy is stored in the inductor. When the first switch is turned "off", inductor current $I_L$ continues to flow due to the inductor energy storage, resulting in a negative voltage across the inductor ($V_L = -V_B$). The inductor current now flows through the second switch, which is forward biased, and current $I_L$ through the inductor decreases. In this "off" state, energy continues to be delivered to the output until the first switch is again turned on to begin another on-off cycle. The buck converter is operated in continuous conduction mode (CCM) when the current through the inductor never falls to zero during the commutation cycle. If the buck converter is operated in continuous conduction mode, the output voltage ($V_B$) is equal to $V_A \times d$, where d is the duty cycle (d=[0,1]) of the switches. The buck converter is operated in discontinuous conduction mode (DCM) when the current through the inductor goes to zero every commutation cycle.

When a buck converter operates in continuous conduction mode, current in the inductor does not decay to zero from the previous cycle. When a metal oxide semiconductor field effect transistor (MOSFET) is used as the first switch and a diode is used as the second switch in the buck converter, the diode still has current in it when the MOSFET is turned "on". When the diode is thusly switched from its "on", forward biased or conducting state to its "off", reverse biased or blocking state, the current in the diode must first be discharged before the diode blocks reverse current. This discharge takes a finite amount of time known as the reverse recovery time (Trr) of the diode. During this time, the diode may briefly conduct current backwards. Diodes that have relatively fast or short reverse recovery times may be referred to as "high speed" or "fast" diodes, while diodes that have relatively slow or long reverse recovery times are typically referred to as "low speed" or "slow" diodes. Some high speed diodes are optimized to have an "ultra-fast" Trr and these are known as "ultra-fast" diodes. High speed diodes are advantageous for providing rapid switching action with lower switching losses and lower electromagnetic interference (EMI) but are disadvantageous for their higher forward voltage, i.e. the forward voltage drop across the diode terminals that occurs when current flows through the diode in its "on", forward biased or conducting state, which causes higher conduction losses with resultant loss of efficiency. Conduction losses can be lowered for increased efficiency by using slower diodes, but slower diodes are disadvantageous for their higher switching losses and higher EMI. Hence, buck converter design often involves a design trade-off between a slower diode (lower conduction losses but higher switching losses and EMI) and a high speed diode (high conduction losses but lower switching losses and EMI).

The efficiency of buck converters can be improved using a technique known as "synchronous rectification". In synchronous rectification, the diode that serves as the second switch in the buck converter can be replaced with a power MOSFET which, like all power MOSFETs, has an intrinsic or inherent anti-parallel parasitic body diode between the source and the drain of the MOSFET transistor. When the body diode is forward biased and conducting current, the MOSFET transistor is turned "on" a short time after the body diode has started to conduct. The MOSFET transistor is turned "off" a short time before the first switch in the buck converter is going to turn back "on". The MOSFET of the second switch in the "on" state behaves as a low value resistance, reducing the forward voltage and yielding lower losses. While this MOSFET is "on", the forward voltage drop of the body diode is limited to the "on" resistance of the MOSFET transistor. This forward voltage drop can be significantly lower than the voltage drop in the diode referred to above as the second switch in the buck converter, thereby lowering conduction losses. However, the synchronous rectification approach is disadvantageous because the anti-parallel body diode of the MOSFET typically has a very long reverse recovery time resulting in higher switching losses and higher EMI.

Another approach to reducing conduction losses in buck converters involves the use of Schottky diodes, which have a characteristically low forward voltage drop and fast switching action. In low voltage buck converters, a Schottky diode can be placed in parallel with a MOSFET and its intrinsic body diode to serve as the second switch. Because the forward voltage drop of the Schottky diode is much lower than the forward voltage drop of the body diode, most of the current that needs to be conducted will flow through the Schottky diode, which has a very short reverse recovery time. Schottky diodes are unavailable for higher voltages, i.e. greater than 150 volts, thus eliminating them as an option for higher voltage buck converters. Even for applications requiring voltages in the range of 80-100 volts, the forward voltage drop of Schottky diodes increases to be comparable or greater than the forward voltage drop of the MOSFET body diodes such that the aforementioned design approach becomes unworkable.

Buck converters can be designed with the second switch composed of two MOSFETs placed in series with a parallel diode, which can be any suitable fast diode including Schottky diodes and ultra-fast diodes. The intrinsic body diodes of the MOSFETs connected in series have twice the forward voltage when "on", so that the parallel diode is favored up to its limitations. A drawback to this approach is that conduction losses are increased because the current must flow through two FETs when in synchronous rectification mode or when carrying current in the forward direction depending upon the topology of the buck converter. Further disadvantages pertain to the floating source on one of the MOSFETs and the inability for the gates of the transistors to be connected and driven from the same gate drive, which may arise when the MOSFETs are different part numbers or due to different part tolerances even when the MOSFETs are the same part number. Although an additional diode can be incorporated in the design to allow the gates to be driven from one common gate drive, the additional diode gives rise to disadvantages including increased forward voltage for diodes having lower reverse recovery times, the effect of leakage inductances, the rate at which current switches to/from the additional diode, slower current slew rates, longer dead times, and conduction losses.

Typically FETs such as MOSFETs are arranged in electrical circuits with the FETs connected in a "source to drain" series configuration. Electrical circuits in which two FETs are connected in a "back to back" series configuration have thus far been limited to applications involving solid state relays and matrix converters. Commercial solid state relays that utilize a "back to back" FETs series configuration, without a parallel diode, block bidirectional DC and AC voltages. The positive and negative polarities blocked in such relays are identical, and therefore the FETs used are identical. The FETs carry current in either direction when "on" and block voltage in either direction when "off". Matrix converters, which are commonly found in large motor drives, are most often used to convert multi-phase AC of one frequency and voltage to multi-phase AC of another voltage and frequency without the need for first converting AC input voltage to DC voltage, filtering with a capacitor, and running through an inverter to generate AC output at a lower voltage and different frequency. Each switch in a matrix converter must block symmetric positive and negative voltages because at any moment in time some of the AC input phases are negative while the AC output needs to be positive, and vice versa. Most matrix converters are used at high voltages, and the MOSFETs needed for these high voltages have a very high resistance. Consequently, most matrix converters employ insulated gate bipolar transistors (IGBTs), which are generally less expensive than MOSFETs for the same level of efficiency.

It is seen from the above that the need exists for a buck converter for a maximum power point tracking charge controller that overcomes the aforementioned problems and disadvantages while allowing the use of MOSFETs that do not have to be of the same type or rating, allowing the use of lower voltage MOSFETs, allowing the use of MOSFETs having a smaller die area, allowing the gates of the MOSFETs to be driven from the same gate drive, allowing simplification of the gate drive, allowing the use of any suitable diode including ultra-fast diodes to optimize for low switching losses, allowing the use of diodes that would otherwise be unsuitable because of their high forward voltage, minimizing the impact from leakage inductance, achieving faster current transfer, minimizing switching losses and dead time, minimizing conduction losses, providing greater overall efficiency, and reducing cost. The need further exists for an electrical switch configuration that overcomes the aforementioned problems and disadvantages in buck converters while being similarly advantageous for use in boost or other types of converters as well as inverters.

SUMMARY OF THE INVENTION

A maximum power point tracking charge controller for photovoltaic systems employs a maximum power point tracking algorithm for tracking the maximum power point of a photovoltaic array at which the photovoltaic array produces maximum power voltage. The charge controller incorporates a buck converter for receiving the maximum power voltage from the photovoltaic array as voltage input to the buck converter and for supplying voltage output from the buck converter to charge a battery bank. The buck converter converts the voltage input to a voltage output that matches the voltage required by the battery bank for charging. The buck converter stores electrical energy when the voltage input is greater than the voltage required by the battery bank for charging. The buck converter comprises an inductor, a first switch comprising a MOSFET, and a second switch comprising a first MOSFET and a second MOSFET connected in a back to back series configuration with a parallel diode, wherein the configuration of the second MOSFET is reversed from or opposed to the configuration of the first MOSFET. The first and second MOSFETs may be n-channel MOSFETs, and the parallel diode can be any suitable diode including Schottky diodes and ultra-fast diodes with fast reverse recovery times to optimize for low switching losses. The first and second MOSFETs can be different type MOSFETs, can be rated for different voltages, and can have different die areas. The gates of the first and second MOSFETs can be driven from a common gate drive at alternative locations.

In addition to buck converters, the electrical switch configuration of the first and second MOSFETs connected in a back to back series configuration with a parallel diode can be used in other circuits including boost or "step up" converters and other converters as well as inverters.

Various objects, benefits and advantages of the present invention will become apparent from the following detailed description of the invention taken in conjunction with the accompanying drawings.

DETAILED DESCRIPTION OF THE INVENTION

Figure 1:
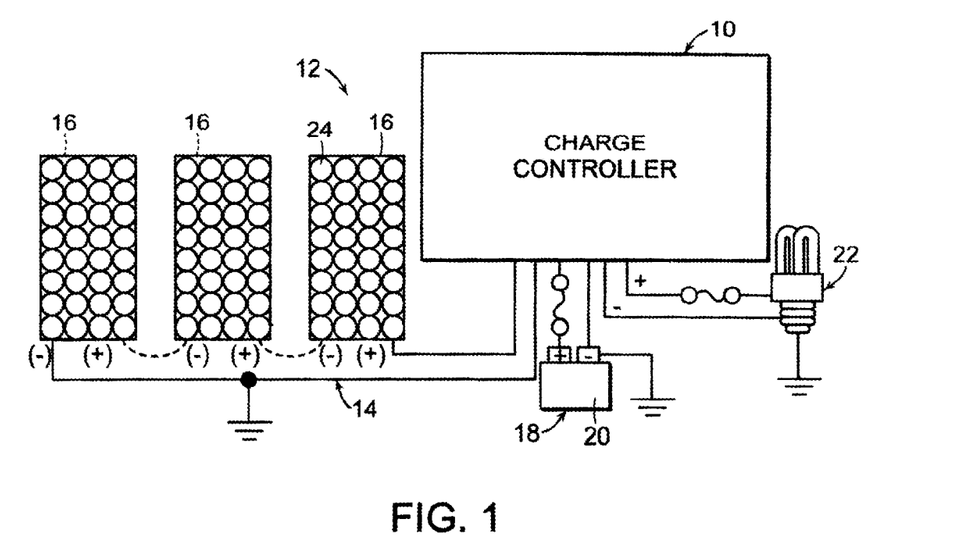
FIG. 1 is a diagram showing a maximum power point tracking (MPPT) charge controller integrated in a photovoltaic (PV) system wherein the MPPT charge controller is electrically connected to a photovoltaic (PV) array, a battery bank, and a load.

A maximum power point tracking (MPPT) charge controller 10 is illustrated in FIG. 1 incorporated in a photovoltaic (PV) system 12. The PV system 12 comprises a photovoltaic (PV) array 14 including one or more photovoltaic (PV) modules or panels 16, a battery bank 18 including one or more batteries 20, and the MPPT charge controller 10 electrically connected to the array 14 and to the battery bank 18. The MPPT charge controller 10 is also shown in FIG. 1 with a load output connection of the controller electrically connected to a load 22 that is to be powered by the PV system 12. The load output connection on the MPPT charge controller 10 functions to deliver battery voltage to the load 22. Typical loads 22 include lights, pumps, motors, DC appliances, and electronic devices. The load output connection of the MPPT charge controller 10 can be electrically connected to a load distribution panel, in which case the load distribution panel may be considered the load 22. The PV system 12 may incorporate an inverter (not shown) electrically connected to the battery bank 18 for converting the DC electricity of the one or more batteries 20 into AC electricity to power an AC load, and the inverter may thusly be considered a load. Although the following description of the invention refers to a PV system in which the PV array 14 is made up of a single PV module or panel 16 and the battery bank 18 is made up of a single battery 20, it should be appreciated that the invention is intended to encompass PV systems in which the PV array 14 is made up of a plurality of PV modules or panels 16 and/or those in which the battery bank 18 is made up of a plurality of batteries 20.

Figure 2:
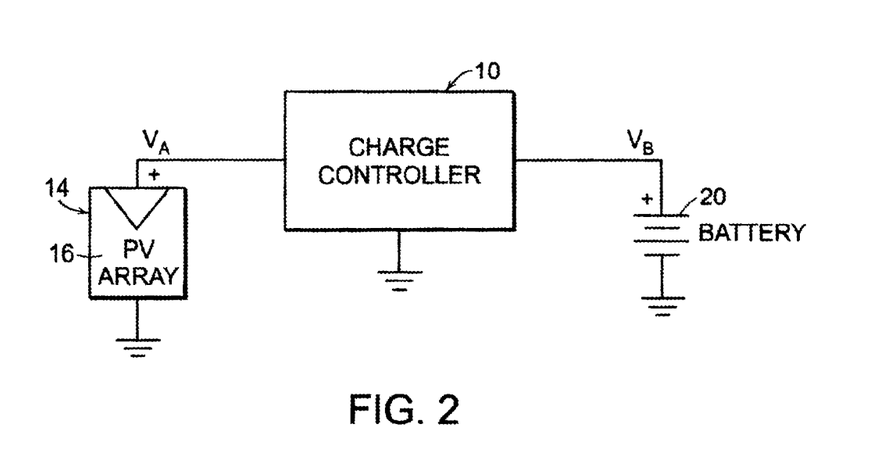
FIG. 2 is an electrical diagram illustrating use of the MPPT charge controller to charge the battery bank with electricity produced by the photovoltaic array.

The PV module 16 is composed of photovoltaic (PV) cells 24 capable of converting solar energy into electrical energy. The battery 20 is capable of storing the electrical energy produced by the PV module 16. As seen in FIG. 2, the MPPT charge controller 10 controls charging of the battery 20 with the electrical energy produced by the PV module 16. The MPPT charge controller 10 receives input voltage $V_A$ from the PV array 14. Output voltage $V_B$ from the MPPT charge controller 10 is supplied to the battery 20. The electrical energy produced by the PV array 14 and stored in the battery 20 is available to power the load 22. In addition, the battery 20 can be used to power the MPPT charge controller 10. Alternatively, the MPPT charge controller 10 can be powered off of the PV array 14.

In one preferential but not limiting embodiment, the MPPT charge controller 10 is designed for use in a PV system 12 in which the PV array 14 is a 12 Volt, 24 Volt, 36 Volt or 48 Volt nominal off-grid PV module array, the system voltage is 12, 24, 36 or 48 Volts, the battery operating voltage is in the range of 8-72 Volts, the maximum battery current is 45 or 60 Amps, the maximum allowable PV array input to the controller is 36 or 48 amps, the maximum input voltage to the MPPT charge controller is 150 Volts, the nominal input power for a maximum battery current of 45 amps is 600 Watts for a 12 Volt battery system, 1200 Watts for a 24 Volt battery system, and 2400 Watts for a 48 Volt battery system, and the nominal input power for a maximum battery current of 60 amps is 800 Watts for a 12 Volt battery system, 1600 Watts for a 24 Volt battery system, and 3200 Watts for a 48 Volt battery system. The nominal voltage of the PV array 14 must be equal to or greater than the nominal voltage of the battery bank 18. The MPPT charge controller 10 can be used in a PV system 12 in which the PV array 14 is made up of one or more grid-tie modules, provided the PV array open circuit voltage ($V_{OC}$) rating does not exceed the 150 Volt maximum input voltage rating at worst case (coldest) PV module temperature.

Figure 3A:
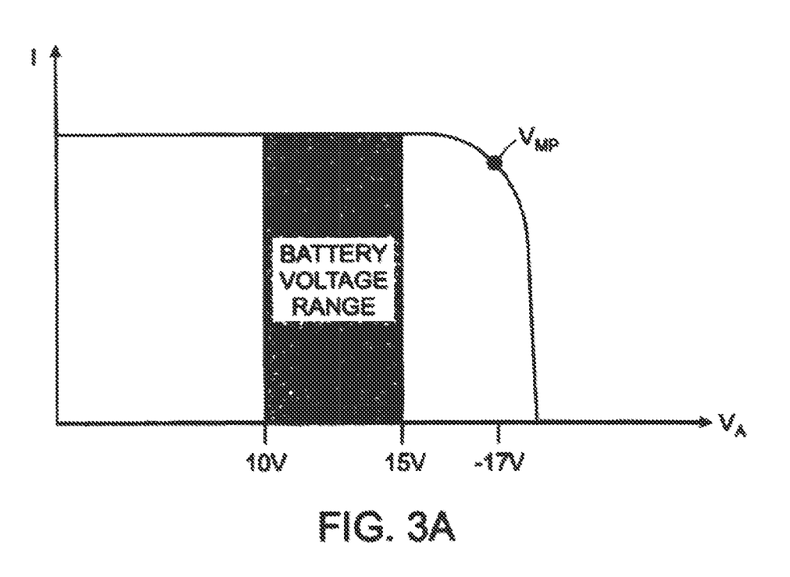
FIG. 3A is a typical current (I) vs. voltage (V) output curve for a nominal 12V off-grid photovoltaic (PV) module of the PV array.
Figure 3B:
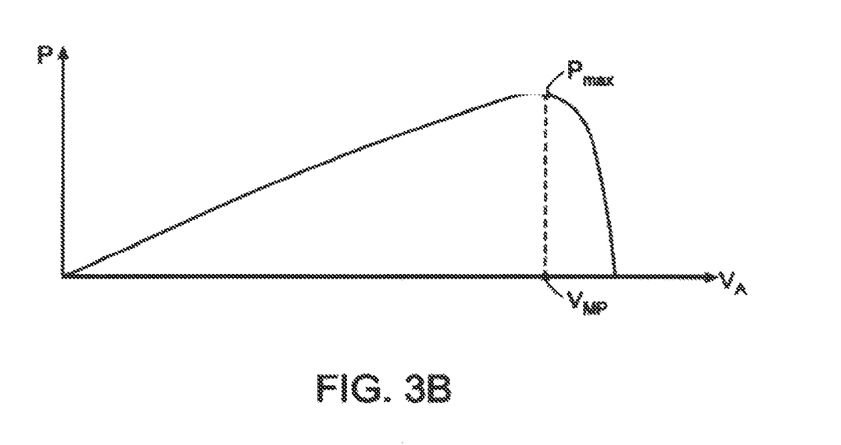
FIG. 3B is a typical power output curve for the nominal 12V off-grid PV module.

FIG. 3A depicts a typical current (I) vs. voltage (V) output curve for a nominal 12V off-grid PV module 16. The maximum power voltage $V_{mp}$ is the voltage where the product of current and voltage (amps×volts) is greatest, and it falls on the "knee" of the PV module I-V curve as shown in FIG. 3A. FIG. 3B is a typical power output curve for the nominal 12V off-grid PV module. In a 12V system, the battery voltage may range from 10-15V DC but the maximum power voltage $V_{mp}$ of the PV module 16 is typically around 16V or 17V as again seen in FIG. 3A. The maximum power voltage $V_{mp}$ varies with operating conditions including weather, sunlight intensity, shading, and photovoltaic cell temperature. As previously explained hereinabove, traditional non-MPPT charge controllers for photovoltaic systems connect the PV module 16 directly to the battery 20 for charging. Charge controllers of this type frequently require that the PV module 16 operate in a voltage range that is below the maximum power voltage $V_{mp}$ of the module 16. Consequently, electrical energy is wasted that could otherwise be used to charge the battery 20 and power the system load 22.

The MPPT charge controller 10 employs maximum power point tracking (MPPT) to manage the disparity between the output voltage of the PV array 14 and the voltage required to charge the battery 20. The MPPT charge controller 10 operates a maximum power point tracking algorithm to identify and track the $V_{mp}$ of the PV module 16, even as the $V_{mp}$ changes with operating conditions, and utilizes power electronics that have a higher input voltage $V_A$ than output voltage $V_B$ to adjust the ratio between the $V_{mp}$ and the current delivered to the battery 20 in order to match what the battery requires. The maximum power point tracking algorithm, which is fully automatic and does not require user adjustment, tracks the $V_{mp}$ as it varies and ensures that maximum power is harvested from the PV array 14 throughout the course of each day. The maximum power point tracking algorithm used in the controller 10 is preferably the TrakStar™ Maximum Power Point Tracking Technology of Morningstar Corporation, Newtown, Pa. The present invention is primarily concerned with the power electronics used in the MPPT charge controller 10 to receive the $V_{mp}$ from the PV array 14 as input and to convert the $V_{mp}$ to battery voltage $V_B$ as output as explained further below.

Figure 4:
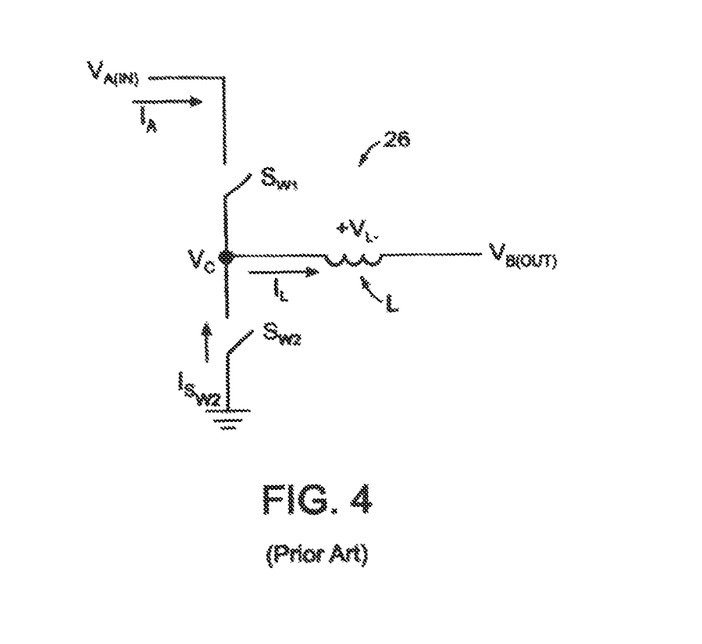
FIG. 4 is an electrical diagram of a basic buck converter as conventionally employed in prior MPPT charge controllers for photovoltaic systems.

In order to lay the groundwork for understanding the approach taken in the MPPT charge controller 10 for converting the $V_{MP}$ to battery voltage $V_B$, it is helpful to consider conventional approaches for buck converters that have various disadvantages and drawbacks overcome with the present invention. Prior MPPT charge controllers for PV systems have conventionally been designed with a DC to DC buck converter to "buck" a higher input voltage to a lower output voltage. The basic buck converter 26 as represented in the electrical diagram of FIG. 4, essentially includes an inductor L and two complementary switches SW1 and SW2 to achieve unidirectional electrical power flow from the buck converter input to the buck converter output. The input voltage $V_A$ to the buck converter 26 is received from the PV array and is oftentimes greater than the output voltage $V_B$ from the buck converter 26 that is needed to charge the battery, hence $V_A > V_B$. First switch SW1 is usually a controlled switch such as a metal oxide semiconductor field effect transistor (MOSFET), and second switch SW2 is usually an uncontrolled switch such as a diode, typically a p-n junction diode. During a switching cycle, the switch SW1 is turned "on" for a time duration and is then turned "off" for a time duration. The buck converter 26 alternates between connecting the inductor L to the input voltage $V_A$ (in) from the PV array to store energy in the inductor L and connecting the inductor L to ground to discharge the stored energy to the output voltage $V_B$ (out) from the buck converter 26 into the battery.

Figure 5:
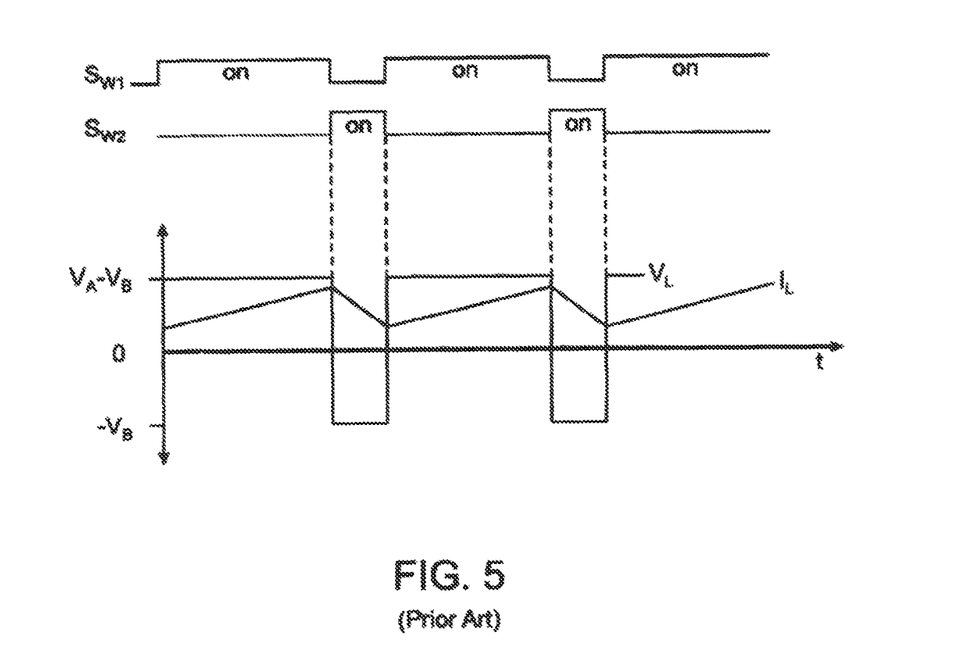
FIG. 5 is a graph illustrating voltage and current through an inductor of the buck converter of FIG. 4 during on-off cycling of first and second switches of the buck converter when in continuous conduction mode.

As best understood with reference to the graph of FIG. 5, when the switch SW1 is turned on, the inductor L is connected to the input voltage $V_A$ and the switch SW2 becomes reverse biased or turned off, resulting in a positive voltage $V_L$ across the inductor equal to $V_A - V_B$ and an increase in the inductor current $I_L$. Furthermore, when the switch SW1 is on, the input current $I_A$ is equal to the inductor current $I_L$ ($I_A = I_L$), and the current $I_{SW2}$ across switch SW2 is equal to zero. In this "on" state for SW1, energy is stored in the inductor L. When the switch SW1 is turned off, inductor current $I_L$ continues to flow due to the inductor energy storage, resulting in a negative voltage $V_L$ across the inductor equal to $-V_B$. The inductor current now flows through the switch SW2, which is forward biased or turned on, and current $I_L$ through the inductor decreases. The input current $I_A$ is now equal to zero and the current $I_{SW2}$ across switch SW2 is equal to the inductor current $I_L$. In this "off" state for SW1, electrical energy continues to be delivered as output until the switch SW1 is again turned on to begin another on-off switching cycle. When the buck converter 26 is operated in continuous conduction mode (CCM), i.e. wherein the current $I_L$ through the inductor L never falls to zero during the commutation cycle, the output voltage $V_B$ is equal to the input voltage $V_A \times d$ where d is the duty cycle (d=[O,1]) of the switches SW1 and SW2. The input current $I_A$, which alternates from $I_n$ to zero as the switch SW1 is turned on and off, is a discontinuous series of pulses.

Figure 6:
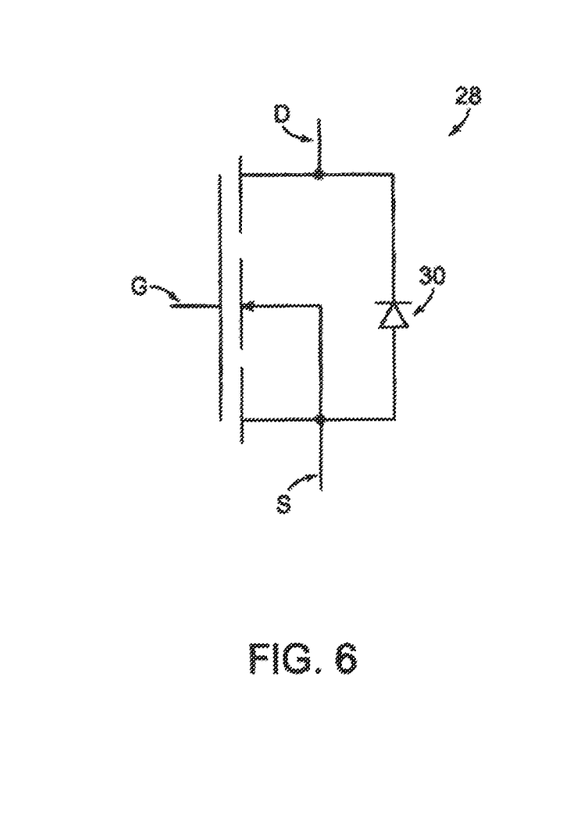
FIG. 6 is an electrical diagram of a conventional metal oxide semiconductor field effect transistor (MOSFET).

FIG. 6 depicts a power MOSFET 28 that may be used as switch SW1 in the buck converter 26. In general principle, the MOSFET 28 is based on the modulation of charge concentration by a metal oxide semiconductor capacitance between a body electrode and a gate electrode that is insulated by a gate dielectric layer composed of an oxide, such as silicon dioxide. The MOSFET 28 includes terminals for the gate G, the source S and the drain D of the transistor. The source S and drain D are each connected to individual, highly doped regions that are separated by a body region. The MOSFET 28 may be an n-channel MOSFET, in which the source S and drain D are n+ regions and the body region is a p region. When sufficient voltage is applied to the gate electrode by a gate drive, holes from the body region are driven away from the gate G, forming an inversion layer or n-channel at the interface between the p region and the oxide. This channel extends between the source S and the drain D, and current is conducted through it when a voltage is applied between the source S and the drain D. The MOSFET 28 characteristically has an inherent, intrinsic, or integral anti-parallel parasitic body diode 30 between the drain D and the source S, making it able to block current in only one direction (unipolar). All power MOSFETs, which are capable of sustaining both high blocking voltage and high current, have this parasitic body diode. When the MOSFET 28 is turned "on", it exhibits a resistant behavior between the drain and source terminals. This resistance is known as $R_{DS\,on}$ or "drain to source resistance in on state", and it is dependent on various factors inherent to the MOSFET. The MOSFET 28 will have a maximum specified drain to source voltage, beyond which failure may occur.

MOSFETs can be manufactured with different design approaches or principles (e.g. lateral vs. trench doping, logic level gate vs. standard gate voltage, etc.) different base materials (e.g. silicon, silicon carbide, GaAs, GaN, etc.), different package sizes (e.g. T0247, T0220, SOT23, etc.) different size die areas, and different operating drives (e.g. enhancement mode vs. depletion mode). Die area is the physical area that the semiconductor wafer, called the "die," occupies. Power MOSFETs are composed of up to millions of tiny parallel transistors, each transistor being a single tiny MOSFET. Accordingly, an individual commercial MOSFET and MOSFET transistor referenced herein in the single grammatical sense is actually made up of many tiny sub-MOSFETs or sub-transistors. The larger the die area of an individual MOSFET, the greater the number of sub-MOSFETs or sub-transistors that can be paralleled, thereby lowering the total resistance possible since resistance decreases as more sub-MOSFETs or sub-transistors are paralleled. For economic reasons, larger dies are usually placed in larger packages (e.g. a T0247 is larger than a T022 which is larger than a SOT23). An operating drive based on enhancement mode requires a voltage to turn the MOSFET "on" whereas a depletion mode MOSFET is inherently "on" and requires a voltage to turn it "off." The MOSFET 28 is depicted as an enhancement mode MOSFET. MOSFETs of the same "type" are identical to one another, except for possible variations due to manufacturer's part tolerances.

Figure 7:
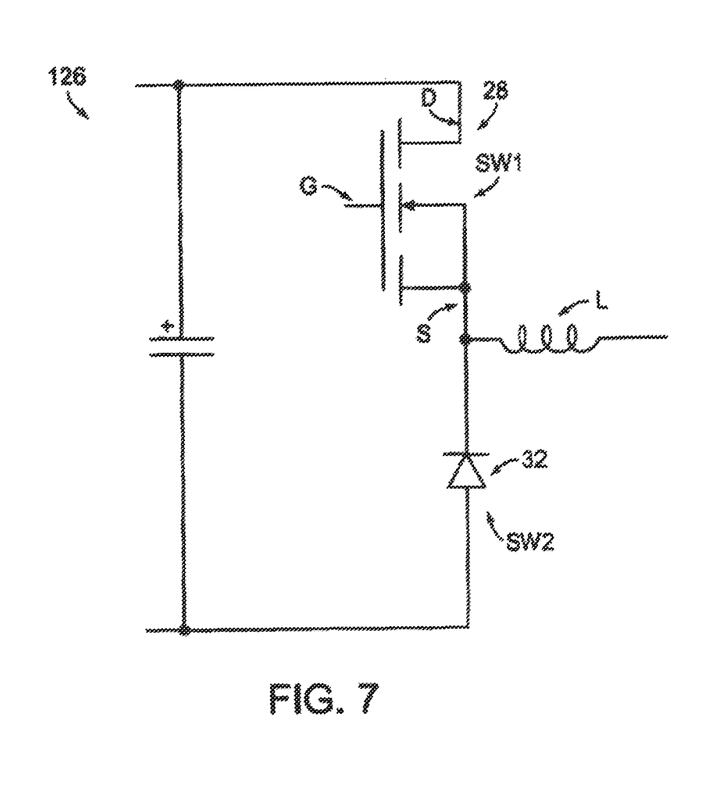
FIG. 7 is an electrical diagram of a basic prior buck converter including a MOSFET as first switch SW1 and a diode as second switch SW2.

A buck converter 126 having a MOSFET 28 as switch SW1 and having a diode 32, such as a p-n diode, as switch SW2 is depicted in FIG. 7, it being noted that the body diode 30 of the MOSFET 28 is not shown in FIG. 7 but is inherently part of the MOSFET 28 as described and illustrated above. If current in the inductor L has not decayed to zero from the previous cycle as in continuous conduction mode, the diode 32 will still have current in it when the MOSFET 28 is turned on. When the diode 32 is thusly switched from its "on", forward biased or conducting state to its "off", reverse biased or blocking state, the current in the diode 32 must first be discharged before the diode 32 blocks reverse current. This discharge takes a finite amount of time known as the "reverse recovery time" (Trr) of the diode. During this time, the diode 32 may briefly conduct current backwards. Diodes that have relatively fast or short reverse recovery times are known as "high speed" or "fast" diodes, while diodes that have relatively slow or long reverse recovery times are known as "low speed" or "slow" diodes. Some high speed diodes are optimized to have an "ultra fast" or "hyper fast" Trr and these are known as "ultra fast" and "hyper fast" diodes. In general, a "slow" generic diode may be considered one having a Trr of 1 to 10 microseconds, a "fast" diode may be considered one having a Trr of hundredths of nanoseconds, and an "ultra fast"/"hyper fast" diode may be considered one having a Trr of less than 100 nanoseconds. When the diode 32 is a high speed diode, it presents the advantages of rapid switching action with lower switching losses and lower electromagnetic interference (EMI) but presents the disadvantage of higher forward voltage, i.e. the forward voltage drop across the diode terminals that occurs when current flows through the diode is in its on, forward biased or conducting state. A higher forward voltage is disadvantageous for the higher conduction losses and resultant loss of efficiency associated therewith. Where the diode 32 is a slower diode, conduction losses can be reduced for increased efficiency. However, slower diodes are disadvantageous for their higher switching losses and higher EMI. The buck converter 126 may thusly require a design trade-off between a slower diode 32 (lower conduction losses but higher switching losses and EMI) and a high speed diode 32 (high conduction losses but lower switching losses and EMI).

Figure 8:
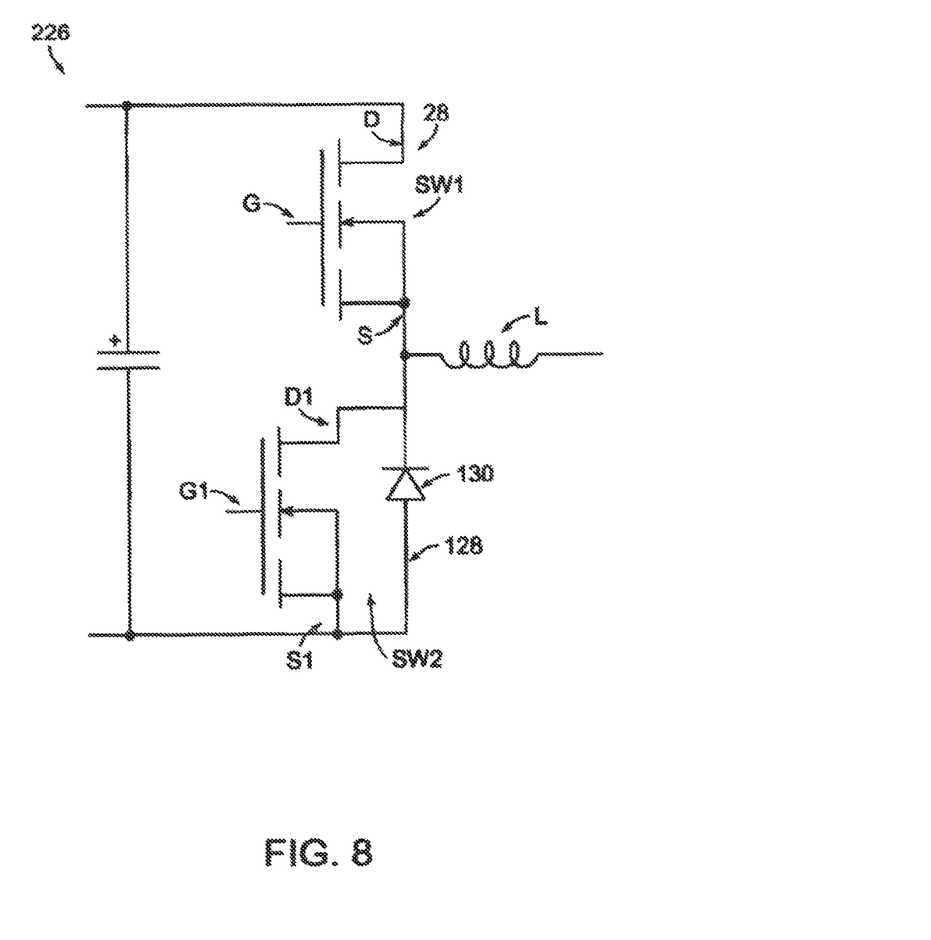
FIG. 8 is an electrical diagram of an alternative prior buck converter including a MOSFET as switch SW1 and a MOSFET as switch SW2.

The buck converter 226 depicted in FIG. 8 is similar to the buck converter 126 except that the diode 32 that serves as the second switch SW2 in the buck converter 126 has been replaced with a power MOSFET 128 having gate G1, source S1, drain D1, and integral body diode 130. The MOSFET 28 has gate G, source S, drain D and an integral body diode 30 that again is not depicted but is inherent as seen in FIG. 6. The buck converter 226 is an example of a technique known as "synchronous rectification" for improving the efficiency of the buck converter. When the body diode 130 is forward biased and conducting current, the MOSFET 128 is turned on a short time after the body diode 130 has started to conduct. The MOSFET 128 is turned off a short time before the first switch SW1, i.e. MOSFET 28, is going to turn back on. The MOSFET 128 in the on state behaves as a low value resistance, reducing the forward voltage and yielding lower losses. While the MOSFET 128 is on, the forward voltage drop of the body diode 130 is limited to the "on" resistance of the MOSFET 128. This forward voltage drop can be significantly lower than the voltage drop in the diode 32 in the buck converter 26, thereby lowering conduction losses. A disadvantage of the buck converter 226 is that the body diode 130 typically has a very long reverse recovery time resulting in higher switching losses and higher EMI.

Figure 9:
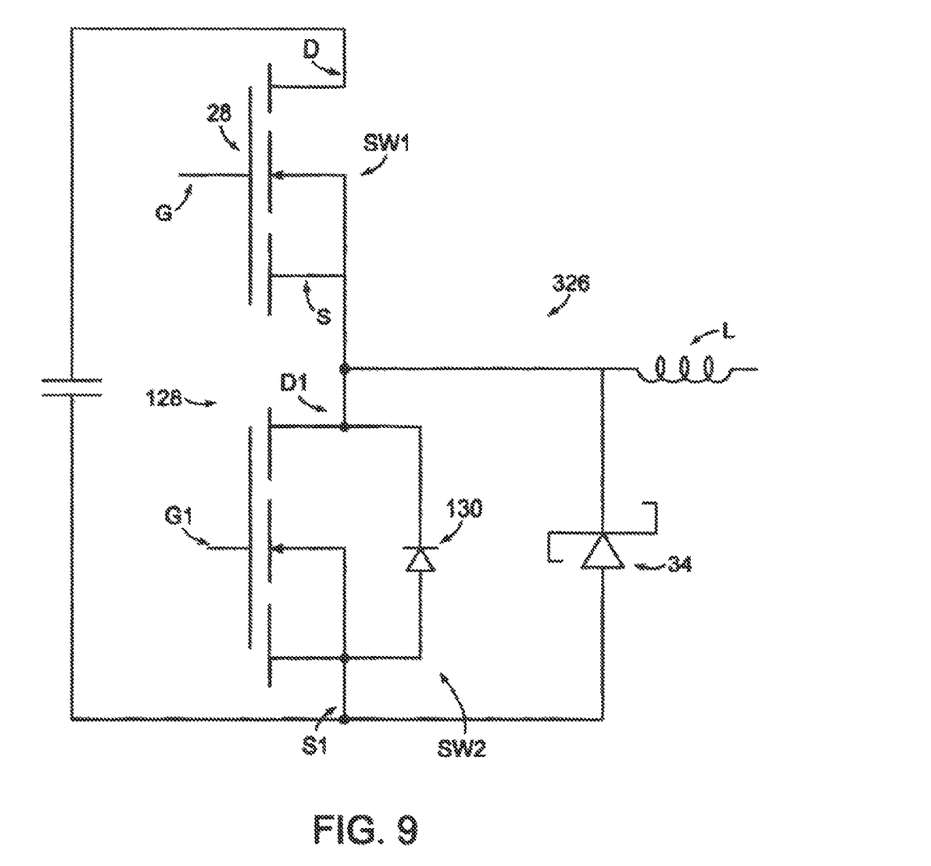
FIG. 9 is an electrical diagram of a further alternative prior buck converter including a MOSFET as switch SW1 and a MOSFET and parallel Schottky diode as switch SW2.

FIG. 9 illustrates a low voltage buck converter 326 comprising MOSFET 28 as the first switch SW1 and a Schottky diode 34 placed in parallel with the MOSFET 128 and its integral body diode 130 as the second switch SW2. Conventionally available Schottky diodes have a characteristically low forward voltage drop and fast switching action. Because the forward voltage drop of the Schottky diode 34 is much lower than the forward voltage drop of the body diode 130 in the buck converter 326, most of the current that needs to be conducted will flow through the Schottky diode 34, which has a very fast reverse recovery time. Schottky diodes are unavailable for higher voltages, i.e. greater than 150 Volts, thus eliminating them as an option for higher voltage buck converters. For applications requiring voltages in the range of 80-100 Volts, the forward voltage drop of commercially available Schottky diodes increases to be comparable to or greater than the forward voltage drop of the MOSFET body diode 130 such that the buck converter 326 becomes unfeasible.

Figure 10:
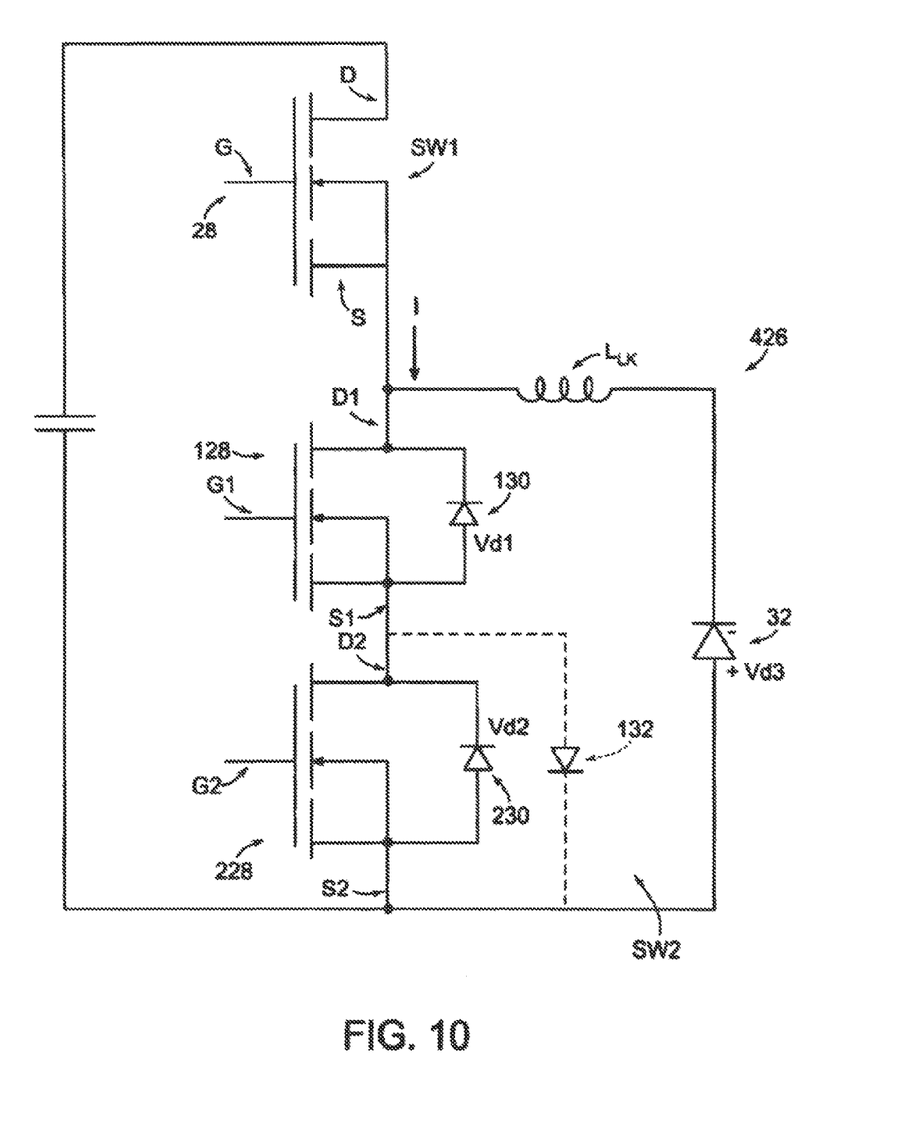
FIG. 10 is an electrical diagram of another alternative prior buck converter including a MOSFET as switch SW1 and a first MOSFET and a second MOSFET placed in series with a parallel diode as switch SW2.

The buck converter 426 depicted in FIG. 10 is an example of one in which MOSFET 28 serves as the first switch SW1 and two MOSFETs 128 and 228 placed in series with a parallel diode 32 serve as the second SW2. The diode 32 can be any suitable fast diode including Schottky diodes and ultra-fast diodes. The MOSFETs 128 and 228 are connected in a source to drain series configuration, the source S1 of MOSFET 128 being connected to the drain D2 of MOSFET 228. The body diodes 130 and 230 conduct current in the same direction when forward biased, and the parallel diode 32 when forward biased conducts current in the same direction as the body diodes 130 and 230. The body diodes 130 and 230 of the MOSFETs 128 and 228 connected in series have twice the forward voltage, such that the parallel diode 32 is favored for conduction up to its limitations. The forward voltages of the body diodes are indicated, respectively, by $V_{d1}$ and $V_{d2}$, while the forward voltage of the diode 32 is indicated as $V_{d3}$. A disadvantage of the buck converter 426 is that current must flow through two FETs when in synchronous rectification mode or when carrying current in the forward direction according to the topology of the buck converter. Consequently, conduction losses are increased. An additional problem is the floating source S1 on MOSFET 128 where, if MOSFET 228 turns off faster than MOSFET 128, the voltage at the S1 terminal can become very high. The same thing can occur if MOSFET 128 turns on before MOSFET 228. The disparity in MOSFET turn off/turn on can occur if the MOSFETs 128 and 228 are different part numbers or due to different part tolerances even when the MOSFETs 128 and 228 are the same part number. In addition, the gates G1 and G2 of the MOSFETs 128 and 228 cannot be connected together and driven from the same gate drive because the high voltage at source S1 would cause a large negative gate to source voltage (Vgs) in MOSFET 128 which would destroy the switch SW1, i.e. MOSFET 28. Consequently, two independent gate drives are needed for the gates G1 and G2 of the MOSFETS 128 and 228, or some other form of limiting the voltage at source S1 must be incorporated in the buck converter 426. As shown in dotted lines in FIG. 10, an additional diode 132 may be included in the buck converter 426 to allow the gates G1 and G2 to be driven from one common gate drive. The additional diode 132 when forward biased conducts current in the opposite direction from the diodes 130, 230 and 32. In this situation, when both MOSFETs 128 and 228 are off, only the differences in the "on" voltages of the two body diodes 130 and 230 versus the "on" voltage of the diode 32 will cause current to transfer into the diode 32. The buck converter 426 modified to include the additional diode 132 still presents limitations because the desirability of using diodes with faster reverse recovery times is offset by the increasing forward voltage drop associated with diodes having faster reverse recovery times. The buck converter 426 has additional limitations pertaining to leakage inductances and the rate at which current will switch to/from the diode 32. When the MOSFETs 128 and 228 turn "on", the voltage applied to the leakage inductance is:

$$|I*Rdson - V_{d3}|$$

where I is the input current, Rdson is the drain to source resistance in on state, and $Vd_3$ is the forward voltage of the diode 32. Since the drain to source resistance in on state can be arbitrarily low by paralleling additional devices, the limiting factor becomes the forward voltage $Vd_3$ of the diode 32 in that higher forward voltage drops are associated with faster current transfer. When the MOSFETs 128 and 228 turn "off", the applied voltage is:

$$|(V_{d1}+V_{d2})-V_{d3}|$$

where $V_{d1}$ is the forward voltage of body diode 130, $V_{d2}$ is the forward voltage of body diode 230 and $V_{d3}$ is the forward voltage of diode 32. In this case, a higher voltage drop on diode 32 slows current transfer. The situations are at odds with one another, and slower current slew rates necessitate longer dead times between switching action which increases conduction losses.

Figure 11:
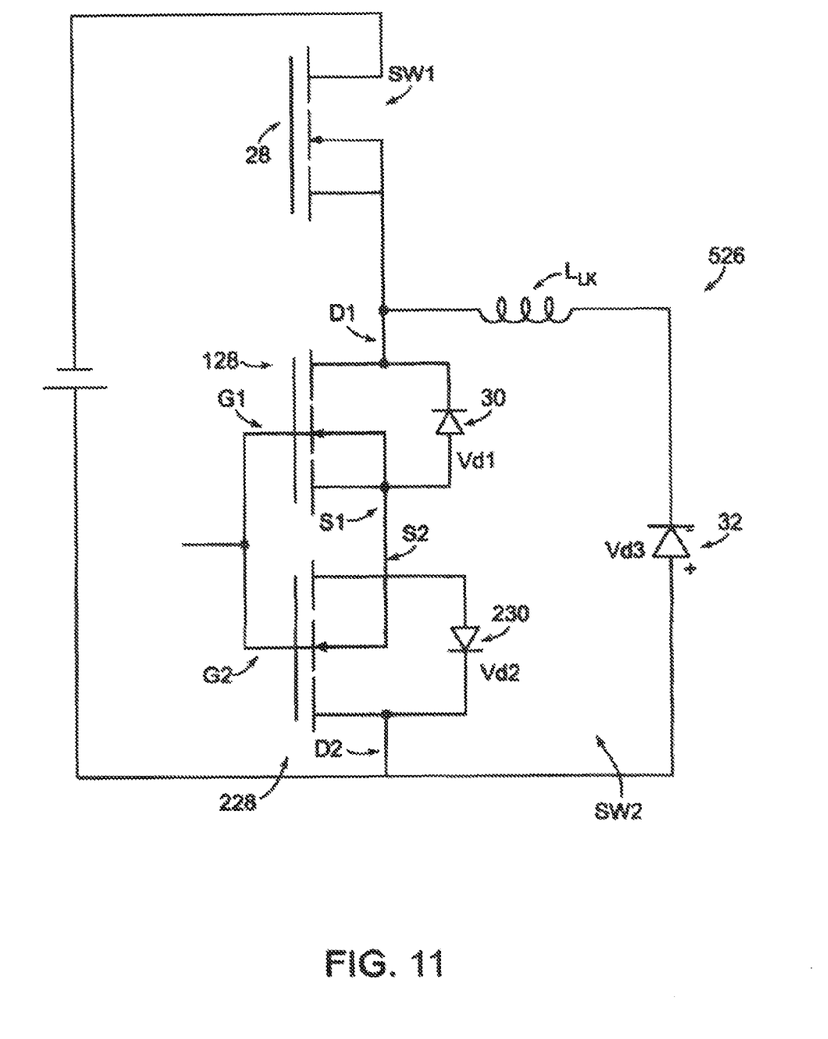
FIG. 11 is an electrical diagram of the buck converter employed in the MPPT charge controller of FIGS. 1 and 2.
Figure 12:
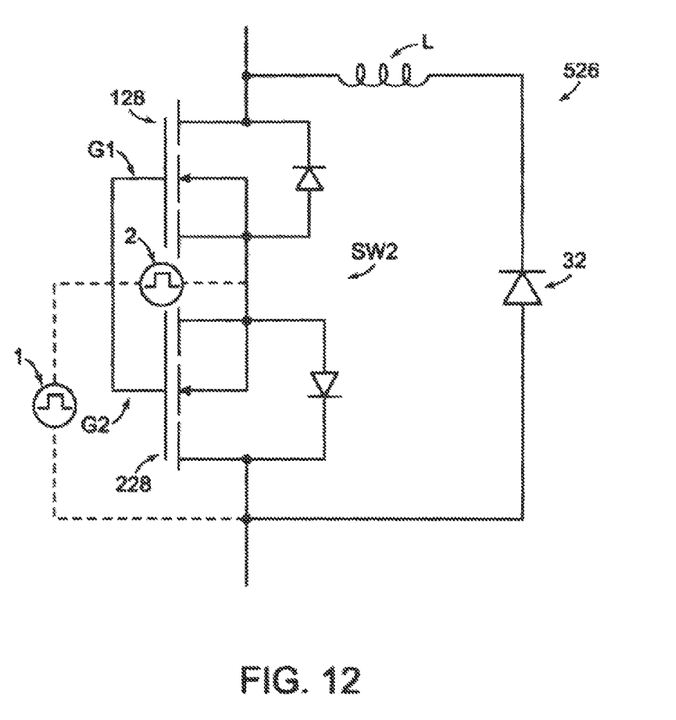
FIG. 12 is an electrical diagram of the second switch SW2 of the buck converter of FIG. 11 showing alternative locations for the gate drive for the MOSFETs of the second switch SW2.

The buck converter 526 employed in the MPPT charge controller 10 is depicted in FIG. 11. The buck converter 526 comprises inductor L, MOSFET 28 as switch SW1 and a switching configuration comprised of two MOSFETs 128 and 228 connected in series with a parallel diode 32 as switch SW2, but with the configuration of MOSFET 228 being reversed from or opposed to that of MOSFET 128 such that the MOSFETs 128 and 228 are back-to-back, reversed or opposed. Accordingly, the MOSFETs 128 and 228 are in series but are connected in reverse polarity, the source S1 of MOSFET 128 being connected to the source S2 of MOSFET 228. The direction of current flow through the body diode 130 when forward biased is reversed or opposite the direction of current flow through body diode 230 when forward biased. The diode 32 when forward biased conducts current in the same direction as body diode 130. When both of the MOSFETs 128 and 228 are "off", their body diodes 130 and 230 block each other and current can only flow through the parallel diode 32. The diode 32 can be any type including diodes having high forward voltages but ultra-fast reverse recovery times to optimize for low switching losses. When both of the MOSFETs 128 and 228 are "on", current can flow through them in series. The gates G1 and G2 of the MOSFETs 128 and 228 can easily be driven from the same gate drive because the body diode 230 performs essentially the same function as the optional diode 132 in FIG. 10. Leakage inductances become less critical in the buck converter 526. When the MOSFETs 128 and 228 turn "on", the situation is similar to buck converter 426 in that a high voltage at diode 32 ($V_{d3}$) speeds current transfer. When the MOSFETs 128 and 228 turn "off", one body diode blocks the other from generating any voltage that would force current into diode 32. The rate of current transfer is limited only by the speed of the gate drive and how fast the MOSFETs 128 and 228 can be turned off. Accordingly, the limiting factor becomes MOSFET turn-on speed and not turn-off speed. By selecting a very high speed diode 32 with a very rapid reverse recovery time, the high forward voltage of the diode 32 will speed the turn-on current transfer of the MOSFETs. Consequently, there will be minimum switching loss in the diode 32, minimum current transfer times through any leakage inductance, minimum dead time, and minimum conduction loss. The gate drive for the MOSFETs 128 and 228 is simplified, and the gates G1 and G2 can be driven from either location 1 or location 2 as seen in FIG. 12, from which switch SW1 has been omitted. The MOSFETs 128 and 228 do not need to be of the same type or rating. MOSFET 128 in the buck converter 526 must be rated for the full input voltage. The voltage for MOSFET 228, however, is very low and will never exceed the forward voltage of the body diode 230 ($V_{d2}$) or the forward voltage of the parallel diode 32 ($V_{d3}$). MOSFET 228 can thusly be rated to a much lower voltage. Historically, the drain to source resistance in on state (Rdson) of different voltage MOSFETs with the same die area demonstrates the higher voltage MOSFET to have an Rdson of approximately a power of 2.5 the lower voltage MOSFET. For example, a 1000 volt FET compared to a 200 volt FET would calculate as:
$(1000/200)^{\wedge}2.5=5^{\wedge}2.5=55.9$ times more resistance in the higher voltage FET. Since the drain to source resistance in on state (Rdson) is approximately a 2.5 mathematical power of the rated MOSFET voltage, low voltage MOSFETs have drastically lower drain to source resistance in on state for the equivalent die area. Thus, MOSFETs 128 and 228 in the buck converter 526 can have different ratings but can be the same die area to obtain a considerably lower total series resistance at lower cost, or the MOSFET 228 can be a smaller die MOSFET than the MOSFET 128 for lower cost.

The MPPT charge controller 10 incorporating the buck converter 526 is capable of achieving peak efficiency of 99% while allowing the use of MOSFETs that do not have to be of the same type or rating, allowing the use of lower voltage MOSFETs, allowing the use of MOSFETs having a smaller die area, allowing the gates of the MOSFETs to be driven from the same gate drive, allowing simplification of the gate drive, allowing the use of any suitable parallel diode including ultra-fast diodes to optimize for low switching losses, allowing the use of diodes that would otherwise be unsuitable because of their high forward voltage, minimizing the impact from leakage inductance, achieving faster current transfer, minimizing switching losses and dead time, minimizing conduction losses and reducing cost while providing greater overall efficiency. In addition, the switching configuration composed of back to back MOSFETs connected in series with the parallel diode can be employed to similar advantage in boost and other converters as well as inverters.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A maximum power point tracking charge controller for photovoltaic systems, comprising
a maximum power point tracking charge controller for electrical connection to a photovoltaic array including one or more photovoltaic modules and to a battery bank to control charging of the battery bank with electricity produced by the photovoltaic array, said charge controller having a maximum power point tracking algorithm for tracking the power point voltage of the photovoltaic array at which the photovoltaic array produces maximum power, said charge controller having a buck converter for receiving voltage input from the photovoltaic array and for supplying voltage output from said buck converter to charge the battery bank, said buck converter converting the voltage input to a voltage output that matches the voltage required by the battery bank for charging, said buck converter storing electrical energy when the voltage input is greater than the voltage required by the battery bank for charging, said buck converter comprising an inductor, a first switch, and a second switch comprising a first MOSFET and a second MOSFET connected in series with a parallel diode, wherein said second MOSFET has a configuration that is the reverse of the configuration of said first MOSFET.

2. The maximum power point tracking charge controller recited in claim 1 wherein said parallel diode is a fast diode.

3. The maximum power point tracking charge controller recited in claim 2 wherein said parallel diode is an ultra-fast diode optimized for lower switching losses.

4. The maximum power point tracking charge controller recited in claim 1 wherein said parallel diode is a Schottky diode.

5. The maximum power point tracking charge controller recited in claim 1 wherein said first and second MOSFETs are connected source to source and the gates of said first and second MOSFETs are driven from a common gate drive.

6. The maximum power point tracking charge controller recited in claim 1 wherein said first and second MOSFETs are different type MOSFETs.

7. The maximum power point tracking charge controller recited in claim 1 wherein said second MOSFET is rated for a different voltage than said first MOSFET.

8. The maximum power point tracking charge controller recited in claim 7 wherein said first MOSFET is rated to the full input voltage to said buck converter, and said second MOSFET is rated to a voltage less than the full input voltage.

9. The maximum power point tracking charge controller recited in claim 8 wherein said first switch is a MOSFET.

10. A maximum power point tracking charge controller for photovoltaic systems, comprising
a maximum power point tracking charge controller for electrical connection to a photovoltaic array including one or more photovoltaic modules and to a battery bank including one or more batteries to control charging of the battery bank with electricity produced by the photovoltaic array, said charge controller having a maximum power point tracking algorithm for tracking the maximum power point of the photovoltaic array at which the photovoltaic array produces maximum power voltage, said charge controller having a buck converter for receiving the maximum power voltage from the photovoltaic array as voltage input to said buck converter and for supplying voltage output from said buck converter to charge the battery bank, said buck converter converting the voltage input to a voltage output that matches the voltage required by the battery bank for charging, said buck converter storing electrical energy when the voltage input is greater than the voltage required by the battery bank for charging, said buck converter comprising an inductor, a first switch comprising a MOSFET, and a second switch comprising a first n-channel MOSFET and a second n-channel MOSFET connected in series with a parallel diode, wherein said first and second n-channel MOSFETs are arranged back-to-back and the gates of said first and second n-channel MOSFETs are driven from a common gate drive.

11. The maximum power point tracking charge controller recited in claim 10 wherein the intrinsic body diodes of said first and second n-channel MOSFETs block current flow therethrough when said first and second n-channel MOSFETs are in the off state such that current can only flow through said parallel diode.

12. The maximum power point tracking charge controller recited in claim 11 wherein current flows through said first and second n-channel MOSFETs in series when said first and second n-channel MOSFETs are in the on state.

13. The maximum power point tracking charge controller recited in claim 12 wherein said buck converter is operable in synchronous rectification mode.

14. The maximum power point tracking charge controller recited in claim 10 wherein said first n-channel MOSFET is rated to the full input voltage to said buck converter and said second n-channel MOSFET is rated to a voltage less than the full input voltage.

15. The maximum power point tracking charge controller recited in claim 14 wherein said second n-channel MOSFET is rated to a voltage no greater than the forward voltage of its intrinsic body diode or the forward voltage of said parallel diode.

16. The maximum power point tracking charge controller recited in claim 10 wherein said parallel diode is selected to have a fast reverse recovery time.

17. The maximum power point tracking charge controller recited in claim 15 herein said parallel diode has a high forward voltage to speed current transfer when said first and second n-channel MOSFETs switch to the on state.

* * * * *